E. B. PARNELL.
PROCESS OF TREATING ORES.
APPLICATION FILED NOV. 26, 1909.
962,383.
Patented June 21, 1910.
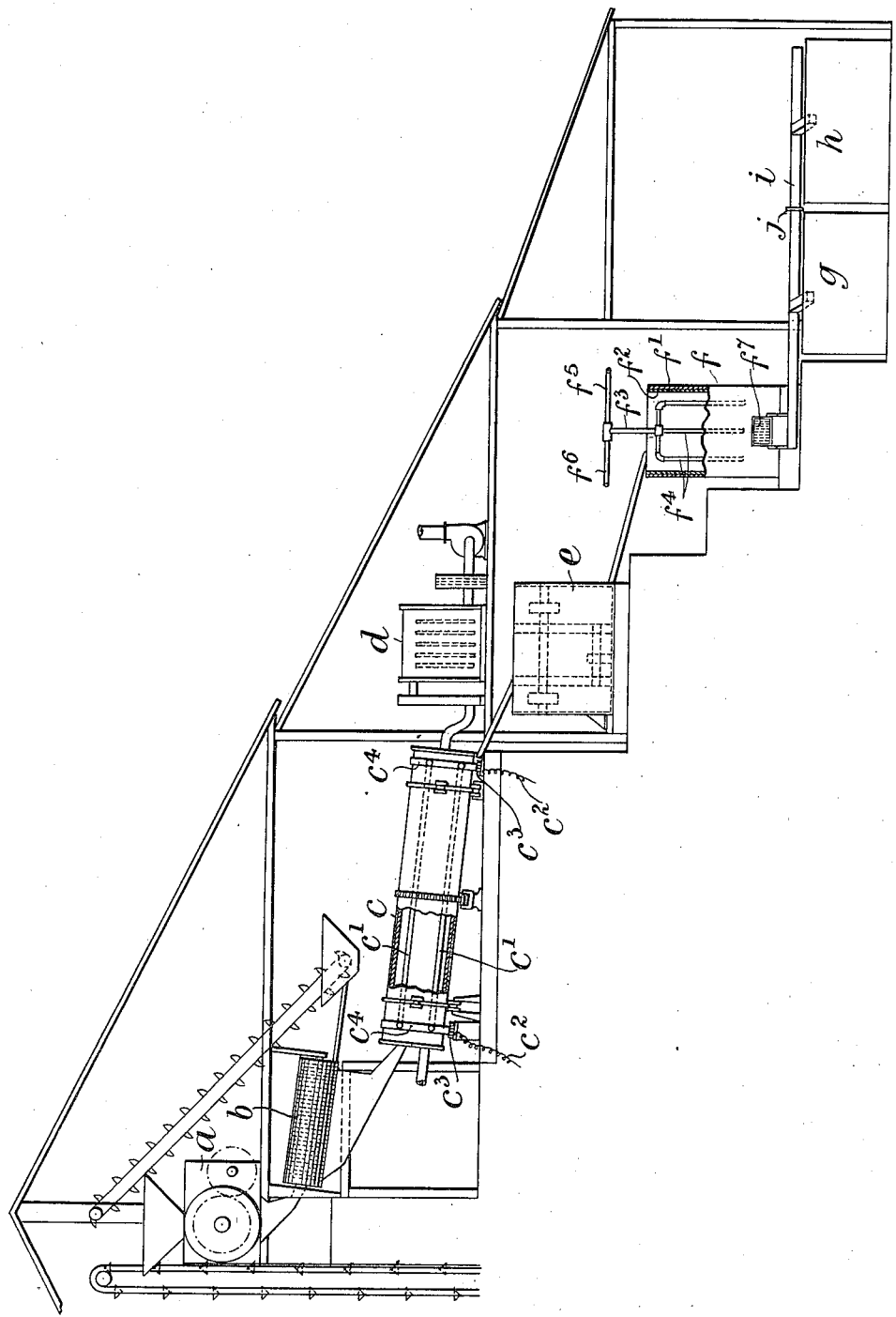
WITNESSES.
INVENTOR.
Elizabeth B. Parnell

UNITED STATES PATENT OFFICE.

ELIZABETH BARNSTON PARNELL, OF CARSHALTON, ENGLAND.

PROCESS OF TREATING ORES.

962,383.  Specification of Letters Patent.  Patented June 21, 1910.

Application filed November 26, 1909. Serial No. 529,977.

*To all whom it may concern:*

Be it known that I, ELIZABETH BARNSTON PARNELL, a subject of His Majesty the King of Great Britain, residing a Carshalton, in the county of Surrey, England, have invented a new and useful Improved Process of Treating Ores, of which the following is a specification.

This invention relates to an improved process of treating ores either free or complex and is particularly applicable to ores containing gold and silver in conjunction with other metals, such for instance as copper, which metals can be converted into a solution such for example as a sulfate.

The main feature of the present invention consists in the treatment of an ore by boiling with a hot blast in water with or without acid for the purpose among others of removing in such a case the sulfates and causing them to pass into solution. As a part of such process the ore to be so treated is preferably first roasted and during such roasting is preferably treated by an electric current the roasting bringing it into such a condition that the iron in it may be removed by a suitable electric separator or otherwise prior to the further treatment for other metals.

Other features of the invention will be set out hereinafter.

According to the preferred form of carrying out the process according to the invention, the ore after crushing and sieving to obtain a uniformity in fineness, is first deprived of its arsenic (if it contain any) by fuming off same to a condenser at a temperature of 550° to 700° F. during which process a free air supply must be maintained to prevent any arsenic falling back upon the ore, and forming compounds with the metals thereby and to insure that it passes to the means, whatever they may be, for condensing same.

The removal of arsenic if necessary is conducted in a roasting furnace of some suitable kind. This furnace may be the same one as that used for some of the subsequent steps of the process, for which latter steps it is preferably provided with electric conductors in the form for instance of plates, bars or rods, from which when current is applied to them a constant mild current may be passed through the ore during roasting. The roasting is facilitated if a small portion of the charge is used as it comes from the rock breaker as the larger pieces—say inch cubes or thereabout—serve to allow of air reaching the ore.

For the purpose of thoroughly subjecting the ore to the current if such is used it may be either rabbled on to or thrown upon the conductors (as the case may be) of the roasting furnace (which may be a stationary or movable one), or the body of the furnace if of conducting material may be connected up to an electric supply. During the period that it is in the furnace the ore in a treatment for sulfates is sprayed with sulfuric acid and water or with liquor obtained from sulfurous fumes saved from the condenser, after removal of the arsenic. The constant mild current and the heat combine to convert the iron in such a case first to an iron sulfate and as the roast is prolonged effect the destruction of such sulfate and the conversion of the ore into a suitable condition for the removal of the iron, the heat also at a later stage converts the copper to the form of sulfate. If zinc be present the heat should not be unduly raised as a small quantity may thereby be fumed off to the condenser. The or is then discharged and passed over any suitable electric or other concentrator which will recover all the iron in aproximately the condition of iron sand. This is more fully secured when the roasted ore is first cooled down.

If zinc is present in the ore it can be recovered after the iron sand has been extracted by passing the ore again over the electric concentrator with a different current or two concentrators differing in current may be used in steps for the recovery of the iron and zinc respectively.

The recovery of the copper is effected when the treatment has reached the stage described, by treatment of the sulfate of copper. For this purpose care must be taken during the treatment in the furnace to form a perfect sulfate to the extent of one hundred per cent. of the metal as this is necessary if full recovery of the precious metals is to be subsequently obtained. This formation of a sulfate of copper in the furnace varies with the time of the roast and the temperature, for example, a copper ore from an Irish mine can be sulfated at a temperature of just over 1000° F. so that up to one hundred per cent. of the metal can be sulfated in say three and a half hours, while, an auriferous Queensland copper ore will at a temperature of over 1200° F. require a roast of from seven to eight hours to give a hundred per cent. sulfation. The ore has now had its iron removed and its copper brought to the form of sulfate. It is now fed into a suitable vessel hereinafter referred to as an agitator and sufficient water is added containing say two to five per cent. of a suitable acid such as sulfuric acid to convert the ore into a thin mud, a hot blast is introduced and in a few minutes, more water may be added. This hot blast may be obtained from a hot stove and fan, or from pipes in the furnace and a fan or otherwise. The charge is thoroughly boiled by the blast for which purpose such blast should be at a high temperature and is also agitated by its action which may be continued for about half an hour in order to bring its copper into solution. The liquor is then run off into tanks in which the pure copper is recovered in some suitable way as by electro-deposition. The ore remaining in the agitator is then thoroughly washed with water.

When the ore is clean any remaining liquor is exhausted from the agitator (or the ore may be removed to a filter press) and then if precious metals are present a cyanid or other suitable solution (or cyanid and quicksilver if the metals present are coarse) is introduced into the charge in the agitator, at which stage oxygen or enriched air is supplied to the agitator from a gas separator or otherwise in such proportion as is suitable to assist the solution of the precious metal. The hot blast is maintained during this dissolving of the precious metals and the cyanid or like solution containing same is drawn off and treated in any known way.

Some ores such as zinc-silver will give better results when the iron is first removed and the remaining ore is converted into chlorids instead of into sulfates. Such ore is first treated in the furnace by roasting and also if desired by the current, the iron is then separated and the ore is returned to the furnace or passed to a second furnace and is heated with salt in addition to the sulfuric acid to convert the metals into chlorids, otherwise the process is the same as for the production of the copper sulfate. As the copper sulfate would rapidly destroy an ordinary steel or iron agitator vessel a vessel which cannot be destroyed by chemical action must be employed. The agitator body for this purpose may be made of wood, or the body may be of iron or steel effectively painted or otherwise protected from the copper liquor. The body should preferably be provided with a lining set in a suitable cement, or in wood; which lining is preferably of glass or earthenware tiles. If wood is used, the pores must be filled with silica, or other innocuous composition which will protect the wood from the destructive action of the acid copper liquor.

To more clearly explain the invention reference is made to the accompanying drawing which illustrates suitable types of apparatus, as an example only of what may be used, but I make no claim to same herein as it forms no part of the invention in the present application.

In this drawing $a$ is a rock crusher of any suitable kind arranged to discharge into a rotating sieve $b$ the finely crushed material from which passes down into a rotating gas fired roasting furnace $c$. This latter is provided with a number of conductors $c'$ through which a current is passed from the external wires $c^2$ by means of brushes $c^3$ and external contact making rings $c^4$, $c^4$, which are connected through the walls of the furnace with the conductors $c'$. The ore which is tumbled over and over by the rotation of the furnace is thus brought into contact with the live conductors. It is in this furnace that the ore may be treated later to convert the base metals into sulfates or chlorids with the accompaniment of spraying or spraying with the salt addition as the case requires. Such furnace is connected to a condenser $d$ in which the arsenic and other fumes may be condensed. From the furnace the ore is discharged to a suitable electric concentrator $e$ in which the magnetic iron is separated from it, the remaining body of ore being discharged into the agitator $f$. This may consist of a tank having an outer casing $f'$ of wood or metal and a glass or earthenware lining $f^2$. Depending into same is a pipe $f^3$ having branches $f^4$ which are open at their lower ends and do not extend to the bottom of the tank. The pipe $f^3$ connects with a pipe $f^5$ from a source of hot air under pressure and a pipe $f^6$ to a supply of oxygen or enriched air. At the bottom of the tank is an opening covered by a solid plate or door, and a removable filter screen $f^7$ through which latter when the door is opened or removed the copper solution passes into the electrodepositing tanks $g$ and through which also the cyanid solution subsequently can pass to a tank $h$ these two tanks being supplied from a common launder $i$ provided with suitable gate $j$. When the filter screen $f^7$ is removed the opening in the tank will suffice for the removal of the exhausted ore.

In the case of ores containing cobalt and silver, the treatment would be the same as for ores containing zinc and silver that is the arsenic would be fumed off the ore heated in the furnace with a weak sulfuric acid spray and then removed and treated in the electric concentrator or concentrators to recover first the iron and then the cobalt as in the case of the zinc. The ore is then returned to the furnace, sprayed with sulfuric acid and salt and heated until chlorid of silver is formed and the charge is removed and treated in the agitator by boiling with the hot blast. The silver is recovered by known methods from the chlorid solution thus formed.

What I claim is:—

1. The herein described process of treating ores containing iron, and other metals which consists in first removing the iron therefrom then bringing a metal contained therein into the form of a solution by boiling same in water and a suitable acid by means of a hot air blast and then recovering such metal.

2. The herein described process of treating ores containing iron, and other metals which consists in roasting same, then removing iron therefrom then boiling same in water and a suitable acid by means of a hot air blast to form a solution of a metal therein and then recovering such metal.

3. The herein described process of treating ores containing iron, arsenic, and other metals which consists in roasting same condensing arsenic fumes then removing iron therefrom in the state of iron sand, then boiling same in water and sulfuric acid by means of a hot air blast to form a solution of a metal therein and then recovering such metal.

4. The herein described process of treating ores containing iron copper and other metals which consists in roasting same treating them during such roasting with sulfuric acid and water to bring the copper into the condition of a sulfate, then removing the iron therefrom in the state of iron sand then boiling same in water and sulfuric acid by means of a hot air blast to form a solution of a metal therein and then recovering such metal.

5. The herein described process of treating sulfid ores containing iron, precious and other metals which consists in roasting same and at the same time converting certain metal contents into sulfates, then removing the iron therefrom in the state of iron sand, then boiling the ore so separated with water and sulfuric acid and a hot air blast to form a solution of a metal therein then removing such solution, treating same for the recovery of the metal and then treating the ore residue to extract the precious metal.

6. The herein described process of treating ores containing iron, precious, and other metals which consists in first removing the iron therefrom, then bringing certain of the metals contained therein into the form of a solution, removing such solution, and boiling the ore residue by means of a hot blast in a cyanid solution to recover the precious metal.

7. The herein described process of treating sulfid ores containing iron, precious and other metals which consists in roasting same and at the same time converting certain metal contents into sulfates, then removing the iron therefrom in the state of iron sand, then boiling the ore so separated with water and sulfuric acid and a hot air blast, to form a solution of a metal therein then removing such solution, treating same for the recovery of the metal, washing the ore residue and then treating with a cyanid solution in the presence of enriched air to extract the precious metal.

8. The herein described process of treating sulfid ores containing iron, precious and other metals which consists in roasting the same and at the same time converting certain metal contents into sulfates, then removing the iron therefrom in the state of iron sand then boiling the ore so separated with water and sulfuric acid and a hot air blast to form a solution of the sulfate, then removing such solution, treating same for the recovery of the metal, washing the ore residue and then treating with a cyanid solution with the addition of a hot blast and in the presence of enriched air.

In witness whereof I have set my hand in the presence of two subscribing witnesses.

ELIZABETH BARNSTON PARNELL.

Witnesses:
B. WESTACOTT,
H. D. JAMESON.